Patented Dec. 18, 1951

2,579,329

UNITED STATES PATENT OFFICE 2,579,329

TRIMETHYLOL PHENOL COMPOUND AND DERIVATIVES THEREOF

Robert W. Martin, Lenox, Mass., assignor to General Electric Company, a corporation of New York No Drawing. Application October 18, 1949, Serial No. 122,128

9 Claims. (Cl. 260—621)

This invention relates to the production of pure crystalline chemical compounds derived from phenols which are useful in the plastics art. More particularly it relates to the production of new and useful salts of 2,4,6-tris(hydroxymethyl)phenol and its derivatives.

So far as is known pure crystalline salts of 2,4,6-tris(hydroxymethyl)phenol have never been isolated. Various references are made in the literature to the possibility of the existence of trimethylol or 2,4,6-tris(hydroxymethyl)phenols (e. g. Granger, Ind. & Eng. Chem. 24, 442–447 (1932)), but such references are in the nature of conjecture as opposed to actual knowledge or proof of the presence of such compounds. On the other hand Stäger and Biert, Helvetica Chimica Acta, 21, 641 (1938), state as a result of their experiments that the phenol trialcohol does not occur in phenolplast formation in alkaline solution. Meyer, Transactions of the Faraday Society, 32, 347 (1936) concluded that either the trialcohol did not form or else that it condensed immediately to form resin with no existence as such. Thus while some mono- and di-methylol phenols have been prepared by the inter-condensation of selected phenols and formaldehyde under alkaline conditions, all efforts, as far as is known, to prepare, separate and identify pure trimethylol phenols or their salts have failed.

It is an object of this invention to prepare and isolate crystalline sodium and barium salts and other derivatives of trimethylol phenol.

It is another object to provide a simple method of manufacture for crystalline sodium and barium salts and derivatives of trimethylol phenol.

It is a further object of this invention to provide useful compositions containing a major proportion of derivatives of trimethylol phenol.

It has been found that sodium and barium salts of trimethylol phenol may be formed very simply and isolated as crystalline compounds. More particularly, it has been found that crystalline sodium and barium salts of trimethylol phenol may be prepared by effecting reaction between about three mols of formaldehyde and one mol of phenol in the presence of about one mol of alkali such as the hydroxides of sodium and barium at a temperature such that no resinous material is formed. This temperature has been found to range up to about 65° C. above which temperature undesired side reactions take place. The salt of trimethylol phenol can then be precipitated by diluting or pouring the reaction mixture into a suitable water-miscible solvent and separated from the liquid by filtration, decantation or other suitable means.

While the example above calls for molar quantities of alkali, only catalytic quantities of alkali, for example, about one per cent by weight, are required for the phenol-formaldehyde reaction. It will be seen therefore that phenol and formaldehyde may be allowed to react to form the trimethylol compound in the presence of a small amount of alkali at which time the rest of the alkali may be added to form the salt.

Many solvents are suitable for precipitating the salts of trimethylol phenol, e. g., methanol, ethanol, n-propanol, isopropanol, tertiary butanol, secondary butanol, isobutanol, n-butanol, tertiary amyl alcohol, allyl alcohol, diacetone alcohol, butyl Carbitol, pyridine, 2-(2'-hydroxyethyl)pyridine, phenyl Cellosolve, acetone, acetonitrile, propionitrile, morpholine, diethylenetriamine, methylal, dimethyl Cellosolve, dioxane, etc. In general alcohols with no more than four carbon atoms are the most efficient precipitating agents and particularly those with two or three carbon atoms. The preferred precipitating agents are ethanol, propanol, isopropanol and acetone. Of these, ethanol is most suitable from the point of view of low cost, availability and purity of the product obtained. Mixtures of the above precipitating agents also have been found to be very useful. Among the mixtures which are suitable are, by volume, 50–50 n-butanol and methanol, 50–50 methanol and acetone and 50–50 n-amyl alcohol and methanol.

The only metal hydroxides found to be suitable for the preparation of salts of 2,4,6-tris(hydroxymethyl)phenols or trimethylol phenols according to this invention are sodium and barium hydroxides. No satisfactory precipitating agent was found for the potassium trimethlyol phenate. When calcium and strontium hydroxides are used, the calcium and strontium salts of mono- and dimethylol phenate precipitate along with the trimethylol phenate and render a separation of the latter impossible. While formaldehyde is mentioned above, equivalent amounts of paraformaldehyde may be used.

The following examples will illustrate the preparation of the sodium and barium salts of trimethylol phenol or 2,4,6-tris(hydroxymethyl)-phenol:

Example I

To 188 parts by weight (2 mols) of phenol were added 90 parts by weight (2.25 mols) of sodium hydroxide which had been previously dissolved in seventy parts by weight of water. The mixture was cooled and allowed to crystallize; 588 parts by weight (7.3 mols) of formalin (37.2% by weight formaldehyde) were added and the mixture stirred. The temperature of the reaction mixture rose spontaneously to a maximum of 45° C. and then dropped slowly. The mixture was kept at room temperature fifteen to twenty hours, dehydrated under vacuum with heat until the temperature in the flask rose to 45° C. and poured into several times its volume of ethanol. After 3–4 hours the resultant precipitate was filtered and dried.

Theoretical yield—412 parts by weight.
Actual yield—335 parts by weight or 81.3% of theory

Example II

To 76.2 parts by weight (0.945 mol) of formalin 23.5 parts by weight (0.25 mol) of phenol were added mixed and cooled to 30° C. To this mixture twelve parts by weight (0.3 mol) of sodium hydroxide in 8 parts by weight of water were added. The reaction mixture was heated at 40° C. for seventy-two hours. Next, 800 parts by weight of ethanol were added to the mixture with vigorous stirring. The resulting precipitate was filtered after standing three or four hours and washed with acetone and dried.

Theoretical yield—51.5 parts by weight
Actual yield—49.4 parts by weight or 96% of theory

Example III

To 140 parts by weight (1.73 mols) of formalin were added forty-seven parts by weight (0.5 mol) of phenol and twenty-four parts by weight (0.6 mol) of sodium hydroxide in sixteen parts by weight of water. The temperature was kept below 40° C. for one hour, then raised to 45° C. for one hour, finally up to 60° C. and kept at the level for six hours. The reaction mixture was poured into 2400 parts by weight of ethanol. After standing fifteen to twenty hours the resulting precipitate was filtered, washed with acetone and dried in a vacuum desiccator.

Theoretical yield—51.5 parts by weight
Actual yield—39.5 parts by weight or 76.8% of theory

Example IV

A solution containing 76.2 parts by weight (0.945 mol) of formalin and 23.5 parts by weight (0.25 mol) of phenol was cooled to 0° C. Next, twelve parts by weight (0.33 mol) of sodium hydroxide dissolved in eight parts by weight of water were added. The temperature of the mixture was kept below 5° C. during the addition of the caustic. The solution was kept seven days at a temperature of 6° C. After this period the solution was poured in to 800 parts by weight of ethanol. The resulting precipitate was filtered after standing for hour hours, washed with acetone and dried in a vacuum desiccator.

Theoretical yield—51.5 parts by weight
Actual yield—16.1 parts by weight of 31.1% of theory.

Example V

Formalin in the amount of 140 parts by weight (1.73 mols), forty-seven parts by weight (0.5 mol) of phenol and forty-seven parts by weight (0.55 equivalents) anhydrous barium hydroxide dissolved in seventy-five parts by weight of hot water were mixed in that order. The reaction mixture was kept at a temperature of 30° C. or lower for two hours. The mixture was allowed to react for twenty-four hours at room temperature. Ethanol in the amount of 1600 parts by weight was added with vigorous mechanical stirring. The resulting precipitate, after standing a few hours, was filtered off, washed with acetone and dried in a vacuum desiccator.

Theoretical yield—125.8 parts by weight
Actual yield—97.9 parts by weight or 77.8% of theory

Example VI

To 76.2 parts by weight (0.945 mol) of formalin were added while stirring 23.5 parts by weight (0.25 mol) of phenol and twelve parts by weight (0.33 mol) of sodium hydroxide, dissolved in fifteen parts by weight of water. The temperature of the reaction mixture was held at 30° C. or less for two hours. The mixture was put in an oven for twenty-two hours at a temperature of 40° C. Next, 804 parts by weight of n-propanol was poured into the reaction mixture and the mix stirred. The resulting precipitate was filtered off, washed with acetone and ether and dried in a vacuum desiccator.

Theoretical yield—51.5 parts by weight
Actual yield—50.8 parts by weight or 98% of theory The identity of the sodium 2,4,6-tris(hydroxymethyl)phenate was established by preparing the known derivative 2,4,6-tris(acetoxymethyl)-phenyl acetate. Twenty-one parts by weight of the supposed sodium 2,4,6-tris(hydroxymethyl)-phenate was suspended in 350 parts by volume of pyridine. To this was added 139 parts by weight of acetic anhydride, the reaction mixture being stirred a few minutes and then heated to 110° C. for ten minutes. The mixture was poured into 1500 parts by volume of a saturated solution of sodium chloride. The ester was extracted with ether from the salt solution, washed and dried and the ether evaporated to give a seventy per cent yield of crude ester which was distilled to give a twenty-eight per cent yield of the purified product. The product boiled at 200–202° C. at 1.4–1.7 mm. Brunson and MacMullen, J. Am. Chem. Soc. 63, 270 (1941), have prepared 2,4,6-tris(acetoxymethyl)phenyl acetate from 2,4,6-tris(dimethylaminomethyl)phenol and acetic anhydride and report a boiling point of 200°–205° C. at 1–2 mm. of Hg. Three determinations of the saponification equivalent of a separate sample gave values of 85.5, 85.9 and 92., while the theoretical value is 88. Carbon was found as 57.99% and 57.95% in two determinations while the theoretical value is 57.92%. Hydrogen was found to be 5.67% and 5.82% while the theoretical value is 5.73%.

A determination of the equivalent weight was carried out by dissolving the dried sodium 2,4,6-tris(hydroxymethyl)phenate in water and titrating with hydrochloric acid using bromphenol blue as the indicator. The equivalent weight of four samples was found to be 209, 206, 204 and 210 while the theoretical value is 206. The equivalent weight of the barium salt was found to be 255 and 258 compared to a theoretical value of 251.7. A sodium analysis of the sodium 2,4,6-tris(hydroxymethyl)phenate conducted by heating the sample in a platinum boat with sulphuric acid and weighing the sodium as sodium sulphate showed the sodium content of two samples to be 10.7% and 10.9% while the theoretical value is 11.16%.

The structure of the salts of 2,4,6-tris(hydroxymethyl)phenol was checked by the following experiment. 1-methoxy-2,4,6-tris(hydroxymethyl)benzene was prepared by reacting fifty parts by weight of the obtained alleged sodium 2,4,6 - tris(hydroxymethyl)phenate in mixture with thirty-seven parts by weight methyl iodide and 120 parts by weight of methanol at 50° C. for about twelve hours. The alcohol was evaporated, the product dissolved in water and extracted with hot tertiaryamyl alcohol, and the alcohol solution filtered. The filtrate was poured into petroleum ether to separate the methylated product which was obtained in a yield of 34.2 parts by weight. Ten parts by weight of the methylated product was dissolved in 100 parts by volume of a one normal sodium hydroxide solution. The solution was cooled to 20° C. and treated with potassium permanganate until a slight excess had been added. The excess permanganate was removed by adding a little ethanol. The manganese dioxide formed in the oxidation was filtered off and the filtrate concentrated and acidified. A white crystalline material separated which sintered at 235° C. and melted at 248° C. This melting point checks with the reported melting point of 248° C. for methoxytrimesic acid (Beil. 10, 581). The acid obtained had a neutralization equivalent of 85.7 as compared to a calculated value of 80 for methoxytrimesic acid. The methyl ester was prepared by refluxing the acid with a three per cent solution of hydrochloric acid in methanol. The ester thus obtained melted at 82–84° C. and showed no depression in melting point when mixed with an authentic sample of the methyl ester of methoxytrimesic acid melting at 84–85° C.

The proof of structure of the sodium 2,4,6-tris(hydroxymethyl)phenate prepared according to this invention also was proved as follows. Fifty parts by weight of the alleged sodium 2,4,6-tris(hydroxymethyl)phenate was heated in a sealed bottle at 70° C. for sixty-nine hours along with 17.8 parts by weight of allyl chloride and 120 parts by weight of methanol. The residue was filtered off and the methanol removed by vacuum distillation leaving the allyl ether as a viscous oil. The ether was refluxed for two hours with sixty-nine parts by weight of butyric acid and ninety parts by weight of acetic anhydride, the excess reagents being distilled off slowly so as to form the butyrate ester. The ester product was distilled under vacuum, part of the product gelling before the distillation was complete. The product had a determined saponification equivalent of 144.3 and 145.4 as compared to the calculated value of 144.7 for 1-allyloxy-2,4,6-tris(butyroxymethyl)benzene.

It will thus be seen that the structure of sodium 2,4,6-tris(hydroxymethyl)phenate has been definitely established by the preparation of the known 2,4,6-tris(acetoxymethyl)phenyl acetate, and from equivalent weight data obtained by the preparation of the known methoxy trimesic acid and the methyl ester thereof. The structure has been further proved by the preparation of the allyl ether and the determination of the saponification equivalent of the butyrate ester of this allyl ether.

It is to be noted that, consistent with the rules of orientation, only those phenols possessing free reactive hydrogen atoms in all three positions ortho and para to the phenolic hydroxyl group can form trimethylol compounds, e. g. phenol, m-cresol and 3,5-xylenol. However, from actual experiment, it has been found that 3,5-xylenol forms a product in which the salts of uni- and bis(hydroxymethyl) - compounds predominate along with resinous products. No evidence has been obtained of the formation of the salt of the tris(hydroxymethyl) compound. When m-cresol is used only low yields of the salts of tris-(hydroxymethyl)compound can be obtained due to the fact that the resins are readily formed. This was shown by a repetition of Granger's work. From the examples given above, it will also be noted that the reaction may be carried out at various temperatures, the lower temperatures ranging at around 0° C. requiring a reaction time of several days while the reaction at temperatures around 60° C. takes place in several hours. However, temperatures of over 65° C. will cause undesirable side reaction.

The sodium and barium 2,4,6-tris(hydroxymethyl)phenates may be reacted with other compounds to provide a class of primary polyhydric alcohols with a wide range of applications in the chemical, plastics and coating arts. Notable among such compounds are the ethers formed by the etherification of the phenolic hydroxyl groups. Such etherification considerably retards the tendency of the tris(hydroxymethyl)-compound to resinify and hence makes it available for a number of other reactions and applications not possible with sodium tris(hydroxymethyl)phenol. For example, etherification of the phenolic hydroxyl group greatly improves the alkali resistance of resinous compositions containing them compared to the same compositions wherein the phenolic group has not been etherified.

The ethers prepared from the sodium and barium 2,4,6-tris(hydroxymethyl)phenates may be represented by the general formula:

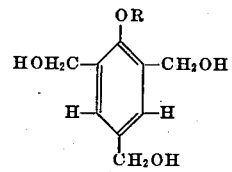

where R represents a member of the class consisting of aliphatic, cycloaliphatic and aryl-substituted aliphatic groups including their halogen-substituted derivatives. The following examples illustrate the preparation of these types of compounds.

*Example VII*

A mixture of 139 parts by weight of sodium 2,4,6-tris(hydroxymethyl)phenate, 126 parts by weight of methyl iodide and 440 parts by weight of methanol was divided equally between three bottles. The bottles were sealed and placed in an oven at 65° C. for about fifteen to twenty hours. The bottles were cooled and opened. The methanol was boiled off and the products were dissolved in amyl alcohol. The amyl alcohol solution was washed with an aqueous solution of sodium carbonate. The amyl alcohol was distilled off under vacuum. The product, 1-methoxy-2,4,6-tris(hydroxymethyl)benzene was a viscous light brown syrup.

Yield=118 parts by weight. Theory=134 parts by weight
Methoxyl content=15.33%, 15.70%
Theory=15.66%

*Example VIII*

To twenty-one parts by weight of sodium 2,4,6-tris(hydroxymethyl)phenate placed in a bottle, eighty parts by weight of methanol and sixteen parts by volume of methyl iodide were added. The bottle was sealed and heated for six hours at 68° C. The reaction mixture was allowed to stand for two days at room temperature. The methanol was evaporated and the product esterified using acetic anhydride and pyridine as an esterifying agent. The ester, 1-methoxy-2,4,6-tris(acetoxymethyl)benzene, was distilled.

Saponification equivalent=107, 106.4
Theory=108
Carbon:
　　Found=59.53%, 59.57%
　　Theory=59.26%

Hydrogen:
    Found=5.96, 6.01
    Theory=6.22

Example IX

To 210 parts by weight of sodium 2,4,6-tris-(hydroxymethyl) phenate was added a solution of 130 parts by weight of allyl bromide in 475 parts by weight of methanol. The mixture was refluxed with stirring for two hours. The methanol was distilled off under vacuum and amyl alcohol added. The amyl alcohol solution was washed with a solution of saturated sodium carbonate-potassium chloride and was dried over anhydrous sodium sulphate. The amyl alcohol was removed under vacuum. The product, 1-allyloxy-2,4,6-tris(hydroxymethyl) benzene, was a brown syrup.

Yield=140 parts by weight. Theory=224.

Example X

Same as Example IX except that the mixture was heated for two and one-half to three hours at 45° C. (and then at 60° C.) for two hours. For a number of reactions of this example the conversion to the allyl ether was found to range from 90 per cent to 100 per cent.

Example XI

Forty-two parts by weight of the sodium 2,4,6-tris(hydroxymethyl) phenate was placed in a bottle with forty parts by volume of a 2.5 per cent solution of sodium hydroxide. 26.6 parts by weight of benzyl chloride was added as well as thirty-two parts by weight of methanol. The reaction ingredients were shaken at 55° C. for forty-eight hours. The cooled contents of the bottle were poured into 200–300 parts by weight of hot water, heated for ten to fifteen minutes and stirred. When stirring was stopped, the product separated out as an oily layer. The washed product was dissolved in acetone, filtered, and the water and acetone distilled off. The product, 1-benzyloxy-2,4,6-tris(hydroxymethyl)-benzene, was a brown syrup. The theoretical yield was 54.8 parts by weight, the actual yield was 38.92 parts by weight or a 71 per cent yield.

Example XII

Example XI was repeated using nineteen parts by weight of 2-methallyl chloride in place of the benzyl chloride. The methanol which had been added in Example XI to increase the solubility of the benzyl chloride in the reaction mixture was not employed. The product, 1-(2'-methallyloxy)-2,4,6-tris(hydroxymethyl)benzene, was a very viscous, almost solid brown syrup. The actual yield was 32.92 parts by weight as compared with the theoretical 47.6 parts by weight or a 69 per cent yield.

Example XIII

Example XI was again repeated using 23.3 parts by weight 2,3-dichloropropene-1 in lieu of the benzyl chloride. Methanol was not used. The product, 1-(2'-chloroallyloxy)-2,4,6-tris(hydroxymethyl)benzene was a viscous brown syrup. The yield of 44.52 parts by weight was 86 per cent of the theoretical value of 51.7 parts by weight.

Example XIV

Example XI was repeated using 23.3 parts by weight of 1,3-dichloropropene-1 in place of benzyl chloride and without the use of methanol. The 1-(3'-chloroallyloxy)-2,4,6-tris(hydroxymethyl)benzene was a viscous brown syrup. The yield was 40.82 parts by weight or 79 per cent of the theoretical value of 51.7 grams.

Example XV

Example XI was repeated using 41.6 parts by weight of isoamyl iodide in place of benzyl chloride and with forty parts by weight of methanol. The produce yield was 9.19 parts by weight as against a theoretical 50.8 parts by weight or 18 per cent. The 1-isoamyloxy-2,4,6-tris-(hydroxymethyl) benzene was obtained as a viscous brown syrup.

Example XVI

Example XI was again repeated using 28.8 parts by weight of n-butyl bromide in place of the benzyl chloride along with forty parts by weight of methanol. The yield of 1-butyloxy-2,4,6-tris(hydroxymethyl)benzene as a viscous brown syrup was 27.85 parts by weight or 57.8% of the theoretical value of forty-eight parts by weight.

Example XVII

One hundred and ninety-two parts by weight of the sodium salt of trimethylol phenol was dissolved in water and 49 parts by weight of dimethyl sulphate added. The mixture was stirred for two hours, 71 parts by weight of sodium hydroxide and 92 parts by weight of dimethyl sulphate added and stirring continued for about 12 hours. The temperature of the mixture was then raised to boiling and extracted while hot with n-amyl alcohol. The product, trimethylol anisole, was obtained in a yield of 135 parts by weight, or a 73% of theory. All of the product was refluxed several hours with an excess of acetic anhydride. The acetic acid and excess acetic anhydride was removed by heating under vacuum. The resulting ester was washed twice with water and distilled at a temperature of 170–180° C. under a reduced pressure of 1–2 mm. of mercury to yield purified tri-(acetoxymethyl)-anisole.

The ethers of trimethylol phenols have been found to be useful as plasticizers for various resins. Their use in conjunction with the various resins increases remarkably the resistance of the resins to alkalies, acids, soap solutions, solvents, and other corrosive chemicals. The weatherability and resistance to salt spray of such treated resins is also greatly enhanced.

These ethers find use in low shrinkage casting resins and in molding and potting compounds. They are useful also in laminating resins and in the production of films, varnishes, wire coatings. The low water absorption and repellent characteristics produced by the ethers make them useful in hot- and cold-setting glues. They have been found also to act as mild curing agents for various synthetic rubbers and also add tack to and ease the milling of such materials.

In order to effect rapid cure of the ethers of tri(hydroxymethyl)phenol catalysts are usually added. Acids or acid engendering reagents have been found most satisfactory. In those cases where the ether group is unsaturated, sulphur and rubber accelerators, as well as metallic driers, are effective. Of the acid type, phosphoric acid has been found most suitable, but other acids such as hydrochloric, maleic, oxalic, etc. can be used.

A particularly suitable class of catalyts are the ammonia or amine salts of sulphuric or sulphonic acids, e. g., ammonium salts of p-toluene sulfonic acid, p-phenol sulfonic acid, o-phenol sulfonic acid; the morpholine salts of p- and/or o-phenol sulphonic acid, of benzene sulfonic acid; ethyl hydrogen sulphate; the urea salt of ortho and/or para phenol sulfonic acid, of p-toluene sulfonic acid; the mono urea, morpholine and ethanolamine salts of sulphuric acid.

This class of catalysts has several advantages. They are readily soluble in the ethers of tris-(hydroxymethyl)phenol and varnishes prepared from such ethers. The acid nature of the catalyst is modified so that corrosion of metallic containers and premature gelation of varnishes during storage is greatly reduced. Thin films cured with this class of catalysts are in general tougher than those cured with acid catalysts. An entirely unexpected advantage derived from the use of this class of catalysts is gloss retention in pigmented films. For example, the addition of several per cent of phosphoric acid to a paint, based on the allyl ether of tri(hydroxymethyl)phenol and pigmented with $TiO_2$, will cause the paint to lose its gloss when baked to effect cure. However, several per cent of salts such as those derived from morpholine or urea and p- and/or o-phenol sulfonic acid can be added to the paint without deteriorating the gloss of the cured paint. In many cases the gloss of the cured film is actually improved over that of an uncatalyzed film by the addition of the catalyst.

The ethers have been found particularly useful as modifiers for the various vinyl type resins.

For example, five parts by weight of polyvinyl alcohol, five parts by weight of water and five parts by weight of 1-allyloxy-2,4,6-tris(hydroxymethyl)benzene were milled on a set of rolls heated at 110 to 130° C. until the water had been removed. The milling characteristics of the mix were satisfactory and a molded piece showed suitable toughness.

Five parts by weight of polyvinyl alcohol, five parts by weight of water and five parts by weight of 1 - (2 - hydroxyethyloxy) - 2,4,6-tris(hydroxymethyl)benzene were milled on a set of heated rolls until the water had evaporated. The mixture of resin and plasticizer milled readily. A molded piece displayed fair flexibility.

Ten parts by weights of polyvinyl butyral, five parts by weight of 1 - benzyloxy - 2,4,6-tris(hydroxymethyl)benzene and eight parts by weight of acetone were mixed and allowed to stand for about five minutes. The mix was then milled on a set of heated rolls, a homogeneous mass being formed very readily. A sheet made from the mix was quite stiff while a piece molded from the material was very hard. These compounds are, therefore, useful for plasticizing resins during molding but yielding rigid molded pieces.

The ethers of the 2,4,6-tris(hydroxymethyl)-phenols may be compounded with fillers and used as casting resins. In this connection, 1-allyloxy-2,4,6-tris(hydroxymethyl)benzene has been compounded with carbon black. After curing, the material was found to be unaffected when immersed in alkali solutions of up to forty per cent which were allowed to boil to dryness on its surface.

While ethers of 2,4,6-tris(hydroxymethyl)phenols have been found to be very useful as plasticizers for various resins, they are rather expensive to produce in the pure state because of the separation process. It has been found that for many applications the ethers of the tris(hydroxymethyl)phenols can tolerate certain amounts of the ethers of 2-(hydroxymethyl)phenol, 4-(hydroxymethyl)phenol, 2,6 - bis(hydroxymethyl)phenol and 2,4 - bis(hydroxymethyl)phenol. It has been further found that the presence of the ethers of the uni- and bis-compounds does not detract appreciably from the beneficial results obtained so long as the ether of the tris-compound is present in the major proportion of more than fifty per cent by weight. In general, if at least 2.5 mols of formaldehyde are used to each mol of phenol, the major proportion of the reaction product will be the tris(hydroxymethyl) compound. Consequently, the corresponding ether mixture will predominate in the ether of the tris(hydroxymethyl)phenol. The formula of such mixtures may be represented as follows:

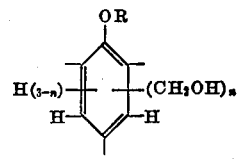

where R represents a member of the class consisting of aliphatic, cycloaliphatic, and aryl-substituted aliphatic groups including their halogen-substituted derivatives, and $n$ is an integer and is at least one but not more than three, and in which the compound in which $n$ is equal to three is in the major proportion.

Examples illustrating the production of such mixtures of methylol phenol ethers are as follows:

*Example XVIII*

Formalin in the amount of 980 parts by weight (12 mols) of 37.5% solution of formaldehyde was added to 376 parts by weight of phenol and mixed thoroughly. A solution of 176 parts by weight of sodium hydroxide in 200 parts by weight of water was added slowly to the mixture with cooling. The reaction mixture was then placed in an oven at 40° C. for fifteen to twenty hours. Analysis showed that 95.6 per cent of the formaldehyde had reacted. The above phenate solution was placed in a flask equipped with a stirrer. To the solution was added 326.5 parts by weight of allyl chloride and the whole stirred vigorously and heated at 60° C. for about two hours. The etherification reaction ran to about ninety-five per cent of completion.

*Example XIX*

Three hundred and fifty parts by weight of phenol and 900 parts by weight of 37.3% aqueous formaldehyde were mixed with stirring. To the solution was added 164 parts by weight of sodium hydroxide in 170 parts by weight of water and the whole reacted for six and one-half hours at 40° C. Analysis showed that 86.6 per cent of the formaldehyde had reacted to give about sixty per cent sodium tris(hydroxymethyl)phenate along with the uni- and bis(hydroxymethyl)phenates. Three hundred and three parts by weight of allyl chloride was added and the mixture reacted in a pressure reactor at 60° C. for three hours with vigorous stirring. Analysis showed that 98.7 per cent of the allyl chloride reacted. The aqueous layer was drawn off and the organic layer dehydrated by heating under a vacuum. The yield was 650 parts by weight of the allyl ethers of the mixed uni-, bis- and tris(hydroxymethyl)phenols with the tris compound being present as the major component.

*Example XX*

Three hundred and thirty-two parts by weight of phenol (96% pure) and 835 parts by weight of a 36.4% aqueous solution of formaldehyde and 160 parts by weight of sodium hydroxide in 167 parts by weight of water were mixed and reacted for seven and one-half hours at 40° C. at which time 83.5 per cent of the formaldehyde had reacted to give a major proportion of sodium tris-(hydroxymethyl)phenate as the product. Allyl chloride in the amount of 273 parts by weight was added and the whole mass heated to 60° C. in an air tight reactor for three and one-half hours with vigorous stirring. At the end of this period 93.1 per cent of the allyl chloride had reacted. The isolated organic layer was dehydrated to yield 625 parts by weight of the allyl ether of mixed uni-, bis-, and tris(hydroxymethyl)phenol with the tris compound as the major component as a brown somewhat viscous oil.

The scope of the useful application of the mixtures of ethers described herein may be more fully appreciated from a consideration of the following:

Ninety-five parts by weight of an allyloxy(hydroxymethyl)benzene, having a hydroxyl content of 22% as against a theoretical 22.6% for the pure tris(hydroxymethyl) compound, showing that the tris compound was the major component, was mixed with five parts by weight of polyvinyl butyral, 130 parts by weight n-butanol, fifteen parts by weight toluene and one part by weight of 85% phosphoric acid. To this mixture was added twenty parts by weight of varnish grade aluminum flake. A test panel of 22 gauge steel which had been bonderized, was sprayed with the above varnish and the coating cured for thirty minutes at 150° C. The panel was partially immersed in a 1½% solution of a household washing powder at 165° F. Minor blistering occurred only after 495 hours of exposure. A typical alkyd varnish similarly tested failed in from two to three hours and an alkali-resistant alkyd varnish in twenty-four hours. A melamine-modified alkyd failed in seventy-two hours.

Fifty parts by weight of allyloxy(hydroxymethyl)-benzene having the same hydroxyl content as that in the preceding example was mixed with five parts by weight of polyvinyl formal resin, twenty-five parts by weight furfural, twenty parts by weight isopropanol and five parts by weight diacetone alcohol. This solution was used as a multiple coating for sand blasted steel test pieces. The six ply multiple coating was cured fifteen minutes between coats and finally for sixteen hours at 180° C., had excellent gloss and hardness and was tan to brown in color. The coatings were resistant to alcohols, amines, hydrocarbon solvents, gasoline, ketones, aldehydes, nitro compounds, chlorinated hydrocarbons, inorganic salt solutions, sodium phenate, phenol and sodium hydroxide. A test piece coated as above withstood a fifty per cent sodium hydroxide solution for 140 days at room temperature with only slight discoloration, and sixteen per cent sodium hydroxide at 90° C.–95° C. for seventy-six days without visible effect. A similar coating prepared from a standard phenolic resin had completely disintegrated after nineteen hours in sixteen per cent caustic at 90° C.–95° C.

Ethers of the hydroxymethylphenols described herein may also be used to advantage in the coating of electrical wiring. For example, a solution of one and one-half to two parts by weight of polyvinyl formal was mixed with about one part by weight of the mixed allyloxy(hydroxymethyl)-benzene with a total of about eighteen per cent solids content. Wire coated with this material was equivalent in electrical insulating qualities to that coated with two parts of polyvinyl formal resin and one part cresylic resin.

It will be evident from the above discussion that the ether products of this invention may serve as chemical intermediates for a great number of intermediates for use in chemical research as well as other uses.

The ethers described herein may also be used as curing agents for butadiene rubbers.

The ethers of the trimethylol phenols may in turn be used to produce ether esters which correspond to the following general formula:

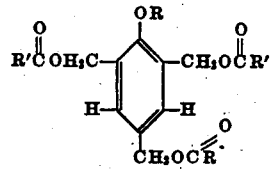

R represents a member of the class consisting of aliphatic, cycloaliphatic and aryl-substituted aliphatic groups including their halogen derivatives and R' represents a member of the class consisting of aliphatic, cycloaliphatic, aliphatic-substituted aryl, aryl and aryl-substituted aliphatic groups including their halogen-substituted derivatives. The ether-esters are most conveniently produced by refluxing the ether with the appropriate acid anhydride or the appropriate acid in the presence of an anhydride of a lower boiling acid.

*Example XXI*

Propionic anhydride in the amount of 370 parts by weight was heated with stirring to reflux. To this was added over a period of about two hours 150 parts by weight of 1-allyloxy-2,4,6-tris(hydroxymethyl)benzene. After all of the ether had been added, the reaction mixture was stirred and refluxed an additional fifteen minutes. The mixture was then heated under vacuum to remove propionic acid and excess propionic anhydride. The resultant ether-ester, 1-allyloxy-2,4,6-tris-(propionoxymethyl)benzene, was a light tan liquid with a viscosity of 34.2 centipoises at 25° C. Samples of product from two different reactions had a saponification equivalent of 134 as compared with a theoretical value of 130⅔.

*Example XXII*

Fifteen parts by weight of 1-benzyloxy-2,4,6-tris(hydroxymethyl)benzene was stirred and refluxed with 103 parts by weight of propionic anhydride for about thirty minutes. The propionic acid and excess propionic anhydride were distilled off under vacuum. The ether-ester product, 1 - benzyloxy - 2,4,6 - tris(propionoxymethyl)benzene, was a tan liquid.

*Example XXIII*

Fifteen parts by weight of 1-benzyloxy-2,4,6-tris(hydroxymethyl)benzene was stirred and refluxed with 109 parts by weight of acetic anhydride for about thirty minutes. The acetic acid formed and the excess acetic anhydride were distilled off under a vacuum. The resultant ester, 1 - benzyloxy - 2,4,6 - tris(acetoxymethyl)benzene, was a tan colored, somewhat viscous liquid.

*Example XXIV*

Fifty parts by weight of sodium 2,4,6-tris(hydroxymethyl)phenate, twenty-seven parts by weight ethyl bromide and 120 parts by weight of methanol were mixed and heated at 80° C. under pressure until the salt had dissolved. The methanol was distilled off at an absolute pressure of about 20 mm. of mercury. The clear light brown viscous ether product 1-ethoxy-2,4,6-tris(hydroxymethyl)benzene, was refluxed for four and one-half hours with eighty parts by weight of acetic anhydride. The formed acetic acid and the excess acetic anhydride were distilled off under a vacuum. After filtering to remove residual sodium bromide a light brown syrupy ether-ester, 1-ethoxy-2,4,6-tris(acetoxymethyl) benzene, remained.

*Example XXV*

Fifty parts by weight of sodium 2,4,6-tris-(hydroxymethyl)phenate, 17.8 parts by weight of allyl chloride and 120 parts by weight of methanol were sealed in a container and heated at about 70° C. for about seventy hours. The resultant ether, 1 - allyloxy-2,4,6-tris(hydroxymethyl)benzene, obtained after filtering off the salt and distilling off the methanol was a viscous oily liquid. The ether product was heated with stirring for about two hours with sixty-nine parts by weight of butyric acid and ninety parts by weight of acetic anhydride. The excess reagents were slowly distilled off. Two of the ether-ester samples had saponification equivalent of 144.3 and 145 as compared to a theoretical 144⅔ for 1 - allyloxy - 2,4,6 - tris(butyroxymethyl) benzene.

Ether-esters such as those above have been used as plasticizers with resins such as cellulose nitrates, cellulose acetates, ethyl celluloses, polyvinyl chlorides and polyvinyl butyrals with success as illustrated below:

About three parts by weight of 1-benzyloxy-2,4,6-tris(propionoxymethyl)benzene, four and one-half parts by weight ethyl cellulose and nine parts by weight of toluene were milled together on rolls heated to 110° C. to 130° C. until the toluene had evaporated. A clear, very pale straw colored sheet resulted. The molded product was clear and tough.

Three parts by weight of 1-benzyloxy-2,4,6-tris(propionoxymethyl)benzene, four and one-half parts by weight of polyvinyl butyral and nine parts by weight of acetone were milled on a set of rolls heated to 110° C. to 130° C. until the acetone had evaporated. A clear, homogenous mix formed very readily. The plasticized resin was a light brown color and was unusually tough and flexible.

Two parts by weight of 1-methoxy-2,4,6-tris-(acetoxymethyl)benzene, two parts by weight of cellulose acetate and four parts by weight of acetone were milled for several minutes on cold rolls. The temperature was then raised to evaporate the acetone. A clear, flexible, well plasticized sheet resulted. When the plasticized resin was molded, flashing of the excess resin from the mold occurred at 135° C. The resultant article was clear, tough and flexible and reflected the beneficial plasticizing action of the ether ester.

Forty parts by weight of 1-allyloxy-2,4,6-tris-(propionoxymethyl)benzene, sixty parts by weight of polyvinyl chloride and five parts by weight of basic lead carbonate was sheeted on heated rolls, a clear sheet forming very readily. The plasticized resin was then molded at 150° C. to 160° C. into a sheet about six inches square and 0.075 inch thick. The brittle point of the resin as tested on a Goodrich brittleness tester was −19° C. The volume resistivity of the resin was $0.15 \times 10^{12}$ ohms/cm.$^3$. The tensile strength was 2370 p. s. i. with an elongation of 312 per cent at the breaking point. The hardness was 87 on the Shore "A" scale.

Three parts by weight of 1-allyloxy-2,4,6-tris-(propionoxymethyl)benzene and four and one-half parts by weight of polyvinyl chloride were formed into a sheet on rolls heated to 110° C. to 130° C. The resin was readily plasticized by the ester. When molded, the excess material flashed from the mold at about 132° C., the molded piece being a clear, straw color product of fair flexibility and good toughness.

Three parts by weight of 1-allyloxy-2,4,6-tris-(propionoxymethyl)benzene and four and one-half parts by weight of polyvinyl butyral were sheeted on a set of rolls heated to 110° C. to 130° C. The ester plasticized the resin readily. During molding of the resin, excess material flashed from the mold at about 90° C. The molded product was very pliable and somewhat rubbery and was a clear amber color.

Three parts by weight of 1-allyloxy-2,4,6-tris-(propionoxymethyl)benzene, four and one-half parts by weight of ethyl cellulose and four parts by weight of toluene were milled on rolls heated to 110° C. to 130° C. until the toluene had evaporated. Plasticization took place quite readily. When molded, the excess material flashed from the mold at 160° C. The molded part was hard, tough and a light tan color.

Three parts by weight of 1-allyloxy-2,4,6-tris-(propionoxymethyl)benzene, four and one-half parts by weight of polyvinyl formal and five parts by weight of ethylene dichloride were milled on rolls heated to 110° C. to 130° C. until the ethylene dichloride had evaporated. The plasticized resin when molded, flashed at about 100° C. and produced a clear straw colored piece which was hard and unusually tough.

The hydroxymethylphenyl ethers of this invention may be condensed to produce a variety of resins in conjunction with such materials as resorcinol, cardinol, etc. By reacting the ethers with polybasic acids, e. g. succinic, phthalic, etc., alkyd-type resins are produced which are useful in forming lacquers and films.

As in the case of the ethers of tris(hydroxymethyl)phenols it has been found that the more economical ether-ester mixtures which contain minor proportions of ether-esters of the uni- and bis(hydroxymethyl)phenols are also very useful as plasticizers. These ether-esters may be prepared from the ether of the hydroxymethylphenol and may be represented by the following general formula

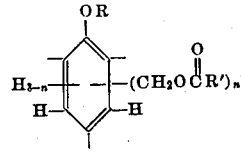

where R represents a member of the class consisting of aliphatic, cycloaliphatic and aryl-substituted aliphatic groups including their halogen substituted derivatives, R' represents a member of the class consisting of aliphatic, cycloaliphatic, aliphatic-substituted aryl, aryl and aryl-substituted aliphatic groups including their halogen-substituted derivatives, and $n$ is an integer of not more than 3 and in which the compound in which $n$ is equal to three is in major proportion.

*Example XXVI*

About 210 parts by weight of a mixture containing 1-allyloxy-2-(hydroxymethyl)benzene, 1- allyloxy-4(hydroxymethyl)benzene, 1-allyloxy-2,4-bis(hydroxymethyl)benzene, 1-allyloxy-2,6-bis(hydroxymethyl)benzene and 1-allyloxy-2,4,6-tris(hydroxymethyl)benzene wherein the tris compound was present as the major component was refluxed for about one hour with about 410 parts by weight of propionic anhydride. The excess propionic anhydride and also the excess propionic acid were distilled off under a vacuum. The filtered ether-ester was a mobile liquid and was a mixture of 1-allyloxy-2(propionoxymethyl)benzene, 1-allyloxy-4(propionoxymethyl)benzene, 1-allyloxy-2,4-bis(propionoxymethyl)benzene, 1-allyloxy-2,6-bis(propionoxymethyl)benzene, 1-allyloxy-2,4,6-tris(propionoxymethyl)benzene wherein the tris compound was present as the major component.

As will be evident from the illustrations below the ester products made from mixed ethers in which the tris(hydroxymethyl) derivative is present in major proportion have great potentialities for use as plasticizers.

Four parts by weight of the propionate esters of a mixture of 1-allyloxy-2(hydroxymethyl)benzene, 1-allyloxy-4(hydroxymethyl)benzene, 1-allyloxy-2,4-bis(hydroxymethyl)-benzene, 1-allyloxy-2,6-bis(hydroxymethyl)benzene and 1-allyloxy-2,4,6-tris(hydroxymethyl)benzene with the last in major proportion, six parts by weight of cellulose nitrate resin and eight parts by weight of acetone was mixed thoroughly and allowed to stand for about fifteen minutes. The ester milled readily into the cellulose nitrate resin and was very compatible.

Four parts by weight of a mixture of 1-methoxy-2(acetoxymethyl)benzene, 1-methoxy-4(acetoxymethyl)benzene, 1-methoxy-2,4-bis(acetoxymethyl)benzene, 1-methoxy-2,6-bis(acetoxymethyl)benzene and 1-methoxy-2,4,6-tris(acetoxymethyl)benzene with the last present in the amount of over fifty per cent, twelve parts by weight of cellulose acetate and eight parts by weight of acetone were thoroughly mixed and allowed to stand overnight. The mix was milled on differential rolls. When the acetone had evaporated and a smooth sheet formed, four additional parts by weight of plasticizer was added while the milling was continued. The plasticized resin was readily molded whereas the unplasticized resin could not be molded.

Another useful class of compounds can be made as follows:

Forty parts by weight of a mixture of 1-allyloxy-2-(butyroxymethyl)benzene, 1-allyloxy-4-(butyroxymethyl) benzene, 1-allyloxy-2,4-bis-butyroxymethyl) benzene, 1-allyloxy-2,6-bis(butyroxymethyl) benzene, and 1-allyloxy-2,4,6-tris-(butyroxymethyl) benzene, the last being over fifty weight per cent of the mixture, sixty parts by weight of polyvinyl chloride and five parts by weight of lead silicate stabilizer was milled on heated rolls. The sheet was molded into a sheet six inches square and about 0.075 inch thick. The brittle point of the resin was —20° C. and the volume resistivity $0.2 \times 10^{12}$ ohms per centimeter cube. The tensile strength was 2045 pounds per square inch, while elongation at the break was 263 per cent. The plasticized sheet was very flexible.

The hydroxyl groups of the tris(hydroxymethyl) phenols may be converted to ether groups by reacting (1) and alkylene oxide corresponding to the general formula

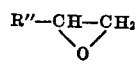

where R'' represents a member of the class consisting of hydrogen, aliphatic, alkoxyaliphatic, aliphatic-substituted aryl, aryl, aryl-substituted aliphatic, and aryloxyaliphatic groups including their halogen-substituted derivatives with (2) a tris(hydroxymethyl) compound corresponding to the general formula

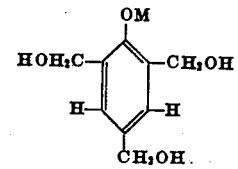

where M represents a member of the class consisting of hydrogen, sodium and barium.

Likewise, the hydroxyl groups of the tris(hydroxymethyl) phenyl ethers may be converted to ether groups by reacting (1) an alkylene oxide corresponding to the general formula

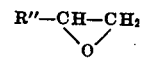

where R'' represents a member of the class consisting of hydrogen, aliphatic, alkoxyaliphatic, aliphatic-substituted aryl, aryl, aryl-substituted aliphatic, and aryloxyaliphatic groups including their halogen-substituted derivatives with (2) a tris(hydroxymethyl) phenyl ether corresponding to the general formula

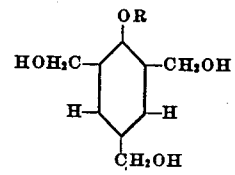

where R has the same meaning as above.

*Example XXVII*

That both the phenolic hydroxyl group and the hydroxymethyl groups of tris(hydroxymethyl) phenols or their salts are reactive to alkylene oxides was shown by the following experiment: Forty-one parts of sodium 2,4,6-tris(hydroxymethyl) phenate (approximately 0.2 mol) was dissolved in 100 pts by weight of water. Fourteen parts by weight of propylene oxide (approximately 0.24 mol) was added and the mixture heated at 40° C. for 6⅔ hours. Analysis of the product by means of ultraviolet absorption showed that the propylene oxide had reacted 60 per cent with the phenate groups and 40 per cent with the hydroxyl group of the hydroxymethyl substituents.

Theoretically, if 4 mols of alkylene oxide had been employed for each mol of sodium tris(hydroxymethyl) phenate each of the three hydroxymethyl groups and the phenolic hydroxyl group would carry a hydroxypropyl substituent. However, since the products formed by reaction of alkylene oxides with tris(hydroxymethyl) phenol are in themselves reactive with alkylene oxides, polyglycols may form on one hydroxymethyl or phenolic group while another group is left unreacted. It therefore becomes evident that pure compounds are not obtained, but instead a mixture of compounds are formed. If more than four mols of alkylene oxide is reacted with sodium tris(hydroxymethyl) phenate or with 2,4,6-tris-(hydroxymethyl) phenol, then polyglycol ethers are of necessity formed. The excess alkylene oxide, above four mols, reacts with the hydroxyl group of the already formed glycol ether to give polyglycol ether groups. A similar condition holds for the reaction of alkylene oxides with tris-(hydroxymethyl) phenyl ethers, except that three mols of alkylene oxide is required before polyglycol ether formation becomes appreciable.

Example XXVIII

One hundred parts of 1-allyloxy-2,4,6 tris-(hydroxymethyl) benzene, ten parts by weight of 1 N sodium hydroxide and sixty parts by weight of ethylene oxide were heated in a sealed container for seventy-two hours at 40° C. The product was a very light straw-colored, honey-like material which was somewhat soluble in water.

The product was a polyethylene glycol ether derivative of the 1-allyloxy-2,4,6-tris(hydroxymethyl) benzene wherein an average of one molecule of ethylene oxide have reacted with each hydroxymethyl group.

Other oxides such as butylene oxide, styrene oxide, glycidyl phenyl ether, glycidyl allyl ether, and butadiene monooxide among others may also be reacted to give analogous compounds all of which are useful as plasticizers for various resins.

Here again for an economical point of view it is advantageous to use reaction products produced from a mixture of the uni-, bis- and tris(hydroxymethyl) compounds with the tris(hydroxymethyl) compound present in an amount of over fifty percent as in the following examples.

Example XXIX

Eighty-six parts by weight of a mixture of 1-allyloxy-2-(hydroxymethyl) benzene, 1-allyloxy-4-(hydroxymethyl) benzene, 1-allyloxy-2, 4-bis-(hydroxymethyl) benzene, 1-allyloxy-2,6-bis(hydroxymethyl) benzene, and 1-allyloxy-2,4,6-tris-(hydroxymethyl) benzene wherein the mixture as a whole contains an average of 2.6 hydroxymethyl groups for each benzene nucleus, forty-two parts by weight of propylene oxide and a trace of sodium hydroxide were heated overnight at 60° C. in a sealed container. The reacted mixture was filtered and neutralized with acid, washed several times with water and dehydrated under a vacuum to yield a clear honey-colored liquid. The compound was the reaction product of one molecule of propylene oxide for each hydroxymethyl group present in the mixture.

Example XXX

An aqueous solution of a mixture of uni-, bis-, and tris(hydroxymethyl) phenols was prepared by reacting at 40° C. for fifteen to twenty hours, ninety-four parts by weight of phenol with 250 parts by weight of approximately 37% aqueous formaline in the presence of four parts by weight of sodium hydroxide dissolved in fifty parts by weight of water. To half of the solution placed in a flask, 230 parts by weight of glycidyl allyl ether was added dropwise. After addition of the ether, the mixture was refluxed for four hours. After thirty to forty-five minutes of heating, a light yellow solution had formed. The final reaction mixture was dehydrated to give 315 parts by weight of a yellow, very slightly viscous oil. This gave a product in which an average of one molecule of the glycidyl allyl ether had reacted for each hydroxy group present in both the phenolic hydroxy and hydroxymethyl group.

Example XXXI

A solution of a mixture of uni-, bis-, and tris-(hydroxymethyl) phenols, containing a major proportion of the tris derivative was prepared by reacting ninety-four parts by weight of phenol, two hundred and fifty parts by weight of aqueous formalin with four parts by weight of sodium hydroxide in fifty parts by weight of water as a catalyst for fifteen to twenty hours at about 40° C. To the resultant solution 280 parts by weight of 3-4 epoxybutene-1 was added dropwise and this mixture refluxed for three hours. The product, after dehydration was a light yellow, slightly viscous oil, in which an average of one molecule of 3-4 epoxybutene-1 had reacted for each hydroxy group present in both the phenolic and hydroxymethyl groups.

Example XXXII

One hundred, eighty-eight parts by weight of phenol, 470 parts by weight of aqueous formalin and eight parts by weight of sodium hydroxide in 100 parts by weight of water were mixed together and heated at 40° C. for fifteen to twenty hours. The reacted solution was halved and to each half, 812 parts by weight of propylene oxide was added dropwise followed by refluxing for three and one-half hours. After the water and small amount of unreacted propylene oxide were distilled off, the mixture was neutralized and further distilled to give an orange, slightly viscous product in which an average of approximately three molecules of propylene oxide had reacted with each hydroxyl group of the mixture of hydroxymethyl phenols.

Example XXXIII

Ninety-four parts by weight of phenol and two hundred and fifty parts by weight of an aqueous formalin solution and four parts by weight of sodium hydroxide in fifty parts by weight of water were mixed and kept at 40° C. overnight. The mixture was cooled and 154 parts by weight of ethylene oxide added. The resulting mixture was heated at 40° C. for two hours and at 60° C. for four hours. The solution was filtered and concentrated in a vacuum with gentle heating. When the temperature inside the flask reached 40° C., the solution was neutralized. The vacuum dehydration was continued until the inside temperature reached 75° C. A very light green, slightly viscous material in the amount of 252 parts by weight was obtained.

Example XXXIV

Eighty-six parts by weight of a mixture of the alloxy-uni-, bis-, and tris(hydroxymethyl)benzenes, a trace of sodium hydroxide and twenty-nine parts by weight of propylene oxide were placed in a sealed bottle and heated at 60° C. for sixteen hours. The reaction mixture was neutralized with hydrochloric acid and the organic layer separated, washed several times with water and dehydrated under a vacuum. The product was a straw-colored syrup in which an average of 0.4-0.5 mol of propylene oxide has reacted for each hydroxymethyl group.

Example XXXV

The 1-(2'-hydroxyethyloxy) - 2,4,6 - tris(hydroxymethyl) benzene was first prepared by reacting about eighteen parts by weight of sodium 2,4,6-tris(hydroxymethyl)phenate with fourteen parts by weight of ethylene bromohydrin. The reactants were dissolved in forty parts by weight of water and heated at 40° C. for about three and one-half hours to give a pale, straw-colored water-soluble syrup. The product was refluxed with about eighteen parts by weight of propylene oxide for seven hours. Two parts by weight of sodium hydroxide in five parts by weight of water was added as a catalyst. At completion of the reaction, the sodium hydroxide was neutralized and the mixture dehydrated under a vacuum. The salt formed by neutralization of the catalyst was filtered off leaving a viscous, very pale-colored syrup in which approximately 0.65-0.70 mol of propylene oxide has reacted for each hydroxyl group present in the 1-(2'-hydroxyethyloxy)-2,4,6 - tris(hydroxymethyl)benzene.

Example XXXVI

A mixture of the alloxy-uni-, bis-, and tris-(hydroxymethyl)-benzenes was treated with propylene oxide in the presence of one per cent of caustic such as sodium hydroxide to produce a water insoluble syrup. This syrup was converted to a propionate ester by refluxing with propionic anhydride. When four parts by weight of the ester were milled with six parts by weight of polyvinyl chloride, a clear, very flexible sheet formed which had excellent color and no odor. Analogous compounds are possible of preparation by using other oxides besides propylene oxide.

Compounds of the above type have also been found very useful in plasticizing alkyd resins, as wax modifiers, surface active agents and humectants. The four hydroxyl groups of these compounds impart rapid air-drying properties to alkyd resins using these compounds as polyhydric alcohols. Fifty parts by weight of the product was refluxed with 350 parts by weight of propionic acid and forty-three parts by weight of toluene for about seven hours. A take-off trap was used to collect water formed during the reaction. The toluene and excess propionic acid were distilled off by heating under a vacuum on a steam bath to give a light-brown mobile liquid ester. Forty parts by weight of this propionate ester, sixty parts by weight of polyvinyl chloride, two and one half parts by weight of litharge and a like amount of lead silicate stabilizer were milled on a set of heated rolls. A molded test piece had a brittle point of −25° C., a volume resistivity of $0.075 \times 10^{12}$ ohms per centimeter cube. The tensile strength was 2,940 pounds per square inch with a 303 per cent elongation at break.

The ethers of the trimethylol phenols may also be reacted with monohydric alcohols to give new and useful products.

The hydroxymethyl groups of tris(hydroxymethyl)phenyl ethers react with alcohols to form, as shown in the equation below, R having the same meaning as above and where R''' represents a member of the class consisting of aliphatic, hydroxy aliphatic, cycloaliphatic, and aryl-substituted aliphatic including halogen and amino derivatives thereof.

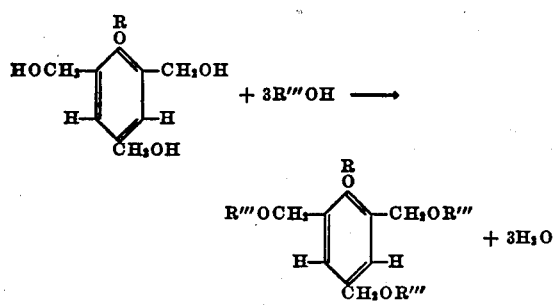

Since this reaction is a stepwise reaction, reaction of the alcohol with one, two and even three hydroxymethyl groups is theoretically possible. However, except with highly reactive alcohols the reaction usually becomes very slow after one or two hydroxymethyl groups have reacted.

The products formed from such a reaction have many uses. The parent tris-(hydroxymethyl)phenyl ethers do not, as a class, dissolve readily in hydrocarbon solvents. Their use in preparing surface coatings, for example, requires the use of strong polar solvents such as alcohols, ketones, esters, etc., all of which are more expensive than most hydrocarbon solvents, particularly the aliphatic hydrocarbons. However, by effecting partial etherification of the hydroxymethyl groups of tris-(hydroxymethyl)phenyl ethers by refluxing with butanol, a product miscible with toluene and other hydrocarbon solvents results.

By reacting the tris-(hydroxymethyl)phenyl ethers with substituted alcohols, such as ethanolamine or ethylene chlorohydrin, an additional functional group can be introduced into the molecule. Products from the reaction of ethylene chlorohydrin with certain tris-(hydroxymethyl) phenyl ethers have been found to act as plasticizers for polyvinyl chloride.

How the reactions are brought about and the type of products obtained can be seen from the examples given below.

Example XXXVII

Fifteen parts by weight of 1-allyloxy-2,4,6-tris(hydroxymethyl) benzene, sixty parts by weight butanol and 0.3 part of concentrated hydrochloric acid were refluxed for two hours. Water and excess butanol were distilled off at atmospheric pressure. The product was a light brown, clear, mobile liquid which was readily soluble in toluene. The hydroxyl content of two samples was 12.65 and 12.82 per cent as compared with a theoretical value of 22.6 per cent for the compound before treatment with butanol. The hydroxyl analysis shows that approximately one hydroxymethyl per molecule of 1-allyloxy-2,4,6-tris-(hydroxymethyl)-benzene has reacted with the butanol.

Example XXXVIII

Fifteen parts by weight of 1-(2'-hydroxyethyloxy)-2,4,6 - tris(hydroxymethyl)benzene, ninety parts by weight of ethylene chlorohydrin, twenty-two parts by weight of toluene and 0.12 part of concentrated hydrochloric acid were refluxed for three hours. The mixture was filtered and distilled under a vacuum to remove unreacted ethylene chlorohydrin and solvent. The product was a mobile tan liquid soluble in toluene and similar solvents. Chlorine content, 25.79, 25.76 per cent; chlorine content calculated for $C_{17}H_{35}O_5Cl_3 = 25.6$ per cent. The chlorine analysis indicates complete reaction of all the hydroxymethyl groups with the ethylene chlorohydrin.

Monohydric alcohols may also be reacted with mixtures of ethers of uni-, bis-, and tris(hydroxymethyl) phenols to yield useful products as follows.

Example XXXIX

One hundred and twenty-five parts by weight of ethanol amine and fifty parts by weight of toluene were heated to reflux and thirty parts by weight of a mixture of allyloxy-uni-, bis-, and tris(hydroxymethyl)benzenes, with the tris compound present in the amount of over fifty per cent by weight, was added through a dropping funnel and the mixture refluxed for four and one-half hours. The water formed was collected in a take-off trap, and the excess ethanolamine and toluene removed under vacuum with heating to 100° C. The product was a viscous brown syrup. Nitrogen analysis 7.13 per cent, 7.19 per cent.

Example XL

One hundred and twenty-five parts by weight of ethylene chlorohydrin and fifty parts by weight of toluene were heated to reflux and 30 parts by weight of a mixture of allyloxy-, uni-, bis-, and tris(hydroxymethyl)benzene, the major part of which was the tri(hydroxymethyl) derivative and 0.5 part by weight of concentrated hydrochloric acid was added from a dropping funnel. The mixture was refluxed four and one-half hours and the water formed collected in a take-off trap. The product remaining after the removal of excess ethylene chlorohydrin and toluene by vacuum distillation was a light brown mobile liquid, soluble in hydrocarbon solvents.

Example XLI

To 1,000 parts by weight of a mixture of the allyloxy-uni, bis-, and tris(hydroxymethyl)-benzenes (Refractive index, 1.561; viscosity, 1588 C. P. at 25° C.) was added with vigorous stirring 11.9 parts by weight of concentrated hydrochloric acid. To the mixture was added 4,000 parts by weight of butanol and the whole refluxed for one and one-half hours and twenty parts by weight of sodium bicarbonate in eighty parts by weight of water added. The water and excess butanol were then distilled off under a vacuum at up to 100° C. The product, after filtering off the salt formed, was a light brown, mobile liquid, soluble in toluene. The refractive index was 1.5318 and the viscosity 329 C. P. at 25° C.

Example XLII

Six hundred parts by weight of a mixture of the allyloxy-, uni-, bis- and tris(hydroxymethyl)-benzenes, six parts by weight hydrochloric acid and 2,200 parts by weight of n-butanol were mixed and refluxed for one hour. About 800 parts by weight of butanol were distilled off at atmospheric pressure. Vacuum distillation was used to remove the remainder of the excess butanol and the water formed, the maximum flask temperature being about 115° C. during the distillation. The product was completely miscible with toluene, dichloroethyl ether, chloroform and similar solvents.

The tris(hydroxymethyl)phenyl ethers are polyhydric alcohols possessing a high degree of reactivity. Products which find use in the manufacture of surface coating materials and varnishes are prepared by reacting the ethers of tris(hydroxymethyl)phenol with acids or acid anhydrides and modifiers. Because of the possibility of reaction between two hydroxymethyl groups, materials of high molecular weight, and resinous in nature can be obtained even when much less than the stoichiometric quantity of a dibasic acid or acid anhydride is employed. Because of this feature, resins with fewer hydrolyzable ester groups than are commonly found in resins of this type are obtained. The procedures employed are illustrated in the examples given below.

Example XLIII

Five parts by weight of 1-benzyloxy-2,4,6-tris(hydroxymethyl)-benzene, one part by weight maleic anhydride and five parts by weight toluene were refluxed together for three hours. Water formed during the reaction was removed by means of a take-off trap. A six mil film laid down with the resultant varnish was cured at 150° C. for one hour, the film curing to a hard coating.

Example XLIV

Ten parts by weight of 1-allyloxy-2,4,6-tris(hydroxymethyl)benzene, two parts by weight of phthalic anhydride, ten parts by weight of cyclohexanone and ten parts by weight of toluene were placed in a flask and refluxed for three and one-half hours, water formed being collected in a take-off trap. To a small sample of the filtered varnish was added sufficient lead and cobalt naphthenate to give a 0.3 per cent lead and 0.03 per cent cobalt content based on solid resins. A six mil film deposited on a test panel and cured for thirty minutes at 150° C. was very hard.

Example XLV

Ten parts by weight of 1-allyloxy-2,4,6-tris(hydroxymethyl)-benzene, two parts by weight of phthalic anhydride, two parts by weight of linseed oil fatty acids, ten parts by weight of cyclohexanone and ten parts by weight of toluene were refluxed together for three and one-half hours. Water formed during the reaction was removed through a take-off trap. To a sample of the filtered varnish was added sufficient lead and cobalt naphthenate to give a lead content of 0.3 per cent and cobalt content of 0.03 per cent based on resin solids. A six mil film deposited on a test panel showed fair wetting characteristics. A film cured at 150° for thirty minutes was very hard and quite tough.

Varnishes made in the same way but using a mixture of uni-, bis-, and tris(hydroxymethyl)-benzene compounds with the latter compound in major proportion are also very useful.

Example XLVI

Eighty parts by weight of a mixture of the allyloxy-uni-, bis-, and tris(hydroxymethyl)-benzenes were refluxed with rapid stirring for about eleven hours along with fifteen parts by weight of maleic anhydride, five parts by weight of castor oil fatty acids, sixty-five parts by weight of toluene and one-half part by weight of concentrated hydrochloric acid. Water formed during the reaction was removed by means of a take-off trap. The varnish remaining was treated with fuller's earth and filtered while still hot. The varnish acid number was 37.4. Sufficient lead and cobalt naphthenate was added to the cooled varnish to give a lead content of 0.3 per cent and a cobalt content of 0.03 per cent based on resin solids. A six mil thick film of the varnish deposited on a glass test panel was dust free in about fifteen minutes, tack free in five hours and thoroughly dry in twenty-one hours. Even after six months' aging, the film was hard and very tough.

Example XLVII

Twenty-two and one-half parts by weight of castor oil fatty acids and six parts by weight of glycerine were heated with rapid stirring under reflux at 220°–240° C. for twenty minutes. The mixture was cooled and seven parts by weight of maleic anhydride, forty-five parts by weight of cyclohexanone, 170 parts by weight xylene, 1.55 parts by weight of hydrochloric acid and 265 parts by weight of a mixture of the allyloxy-uni-, bis-, and tris(hydroxymethyl)-benzenes was added. The reactants were stirred rapidly and refluxed for seven hours. Water formed during the reaction was removed through a take-off trap. The resultant varnish had an acid number of twenty-one. Eighteen parts by weight of the varnish were mixed with 0.27 part by weight of a cobalt naphthenate drier (6 per cent cobalt). Films deposited using the varnish were dust free in six minutes, tack free in about thirty hours and thoroughly dried in seventy-two hours. After one month the film was very tough.

*Example XLVIII*

Forty-five parts by weight of hydroabietyl alcohol, forty-five parts by weight of cyclohexanone, 170 parts by weight xylene, seven parts by weight maleic anhydride, 1.55 parts by weight concentrated hydrochloric acid and 248 parts by weight of a mixture of the allyloxy uni-, bis-, and tris(hydroxymethyl) benzenes were heated under reflux and with stirring for seven hours. Water formed was collected in a take-off trap. The resultant varnish was filtered with fuller's earth. Sufficient cobalt naphthenate was added to a sample of the varnish so that varnish contained 0.3 per cent cobalt, based on resin solids. A film of the varnish was spread on a glass test panel and allowed to air dry. The film was dust free in six minutes, tack free in about seven hours and thoroughly dry in forty-eight hours. The film was also tough.

What I claim as new and desire to secure by Letters Patent of the United States is:

1. As new chemical compounds, crystalline salts selected from the class consisting of the sodium and barium salts of 2,4,6-tris(hydroxymethyl)phenol.

2. Crystalline sodium 2,4,6-tris(hydroxymethyl) phenate.

3. Crystalline barium 2,4,6-tris(hydroxymethyl) phenate.

4. The process of preparing crystalline salts selected from the class consisting of the sodium and barium salts of 2,4,6-tris(hydroxymethyl) phenol which comprises reacting (1) a phenate selected from the class consisting of sodium phenate and barium phenate with (2) an aldehyde selected from the class consisting of formaldehyde and paraform at a temperature not exceeding substantially 65° C., diluting the reaction mixture with a water-soluble organic liquid selected from the class consisting of alcohols having at most four carbon atoms, acetone, dioxane, diacetone alcohol and mixtures thereof to cause the desired product to separate as a solid crystalline precipitate while keeping the undesired reaction products in solution and separating the crystalline salt from the liquid phase.

5. The process of preparing crystalline sodium 2,4,6-tris(hydroxymethyl)phenate which comprises (1) reacting sodium phenate with an aldehyde selected from the class consisting of formaldehyde and paraformaldehyde at a temperature not exceeding substantially 65° C., (2) diluting the reaction mixture with a water-soluble organic liquid selected from the class consisting of alcohols having at most four carbon atoms, acetone, dioxane, diacetone alcohol and mixtures thereof to cause the desired product to separate as a solid crystalline precipitate while maintaining the undesired reaction products in solution, and (3) separating the aforesaid crystalline sodium salt from the liquid phase.

6. The process of preparing crystalline sodium 2,4,6-tris(hydroxymethyl)phenate which comprises (1) reacting sodium phenate with formaldehyde at a temperature not exceeding substantially 65° C., (2) diluting the reaction mixture with ethanol to cause the desired product to separate as a solid granular precipitate while maintaining the undesired reaction products in solution, and (3) separating the aforesaid crystalline sodium salt from the liquid phase.

7. The process of preparing crystalline barium 2,4,6-tris(hydroxymethyl)phenate which comprises (1) reacting barium phenate with formaldehyde at a temperature not exceeding substantially 65° C., (2) diluting the reaction mixture with ethanol to cause the desired product to separate as a granular solid precipitate while maintaining the undesired reaction products in solution, and (3) separating the aforesaid crystalline barium salt from the liquid phase.

8. In the manufacture of sodium 2,4,6-tris(hydroxymethyl)phenate, the process which comprises (1) condensing in the following molar ratios one mol of phenol with about three mols of formaldehyde and one mol of sodium hydroxide, (2) maintaining the mixture at a temperature at which substantially no resinification will occur until methylolation is complete, (3) pouring the reacted mixture into ethanol, and (4) separating the precipitated sodium trimethylol phenate compound.

9. The process of preparing crystalline barium 2,4,6-tris(hydroxymethyl)phenate which comprises (1) reacting barium phenate with an aldehyde selected from the class consisting of formaldehyde and paraformaldehyde at a temperature not exceeding substantially 65° C., (2) diluting the reaction mixture with a water-soluble organic liquid selected from the class consisting of alcohols having at most four carbon atoms, acetone, dioxane, diacetone alcohol and mixtures thereof to cause the desired product to separate as a granular solid precipitate while maintaining the undesired reaction products in solution and (3) separating the aforesaid crystalline barium salt from the liquid phase.

ROBERT W. MARTIN.

REFERENCES CITED

The following references are of record in the file of this patent:

UNITED STATES PATENTS

| Number | Name | Date |
| --- | --- | --- |
| 1,614,171 | Amann et al. | Jan. 11, 1927 |
| 2,091,183 | Murray et al. | Aug. 24, 1937 |
| 2,152,851 | Lecher et al. | Apr. 4, 1939 |
| 2,302,743 | Carruthers | Nov. 24, 1942 |
| 2,329,033 | Britton | Sept. 7, 1943 |
| 2,395,581 | Richter | Feb. 26, 1946 |
| 2,413,860 | Brookes | Jan. 7, 1947 |
| 2,440,909 | Niederl | May 1, 1948 |
| 2,445,627 | Morris | July 20, 1948 |
| 2,486,925 | Frances | Nov. 1, 1949 |
| 2,504,064 | Bock | Apr. 11, 1950 |